United States Patent
Lin et al.

(10) Patent No.: US 10,261,283 B2
(45) Date of Patent: Apr. 16, 2019

(54) OPTICAL LENS, ASSEMBLING METHOD THEREOF, AND LENS BARREL

(71) Applicant: Genius Electronic Optical Co., Ltd., Taichung (TW)

(72) Inventors: Chia-Ming Lin, Taichung (TW); Yu-Ming Chen, Taichung (TW); Chia-Wei Chuang, Taichung (TW)

(73) Assignee: GENIUS ELECTRONIC OPTICAL (XIAMEN) CO., LTD., Fujian (CN)

( * ) Notice: Subject to any disclaimer, the term of this patent is extended or adjusted under 35 U.S.C. 154(b) by 12 days.

(21) Appl. No.: 15/480,392

(22) Filed: Apr. 6, 2017

(65) Prior Publication Data

US 2018/0239104 A1  Aug. 23, 2018

(30) Foreign Application Priority Data

Feb. 23, 2017  (CN) .......................... 2017 1 0098823

(51) Int. Cl.
*G02B 7/02* (2006.01)

(52) U.S. Cl.
CPC ..................... *G02B 7/026* (2013.01)

(58) Field of Classification Search
CPC .. G02B 3/0068; G02B 3/0018; G02B 6/4204; G02B 6/4219; G02B 6/4201; G02B 6/4244; G02B 6/4257; G02B 7/02; G02B 7/025; G02B 7/022; G02B 7/023; G02B 7/026; G02B 7/027
USPC .................................. 359/811–830
See application file for complete search history.

(56) References Cited

U.S. PATENT DOCUMENTS

| 4,737,017 A * | 4/1988 | Nagasaka | G02B 7/026 |
| | | | 359/811 |
| 2003/0043728 A1* | 3/2003 | Kan | B29C 65/08 |
| | | | 720/681 |

* cited by examiner

*Primary Examiner* — Mahidere S Sahle
(74) *Attorney, Agent, or Firm* — JCIPRNET

(57) ABSTRACT

An optical lens including a lens barrel, a fixing ring, and at least one lens element is provided. A bonding surface is provided on an inner side of a periphery of an end of the lens barrel, and a plurality of micro-structures are disposed on the bonding surface in a ring-shaped arrangement. The microstructures protrude from the bonding surface. The fixing ring is disposed inside the bonding surface of the lens barrel. The lens element is disposed inside the lens barrel. The microstructures on the bonding surface and the fixing ring are dissolved by a solvent, so as to fix the lens element inside the lens barrel. An assembling method of the optical lens and a lens barrel are also provided.

17 Claims, 5 Drawing Sheets

US 10,261,283 B2

OPTICAL LENS, ASSEMBLING METHOD THEREOF, AND LENS BARREL

CROSS-REFERENCE TO RELATED APPLICATION

This application claims the priority benefit of Chinese application serial no. 201710098823.6 filed on Feb. 23, 2017. The entirety of the above-mentioned patent application is hereby incorporated by reference herein and made a part of this specification.

BACKGROUND OF THE INVENTION

1. Field of the Invention

The invention relates to an optical device and an assembling method thereof, and particularly relates to an optical lens, an assembling method thereof, and a lens barrel.

2. Description of Related Art

In an optical lens, in order to fix lens elements inside a lens barrel, a fixing ring is disposed on an outermost side of the lens elements, and a solvent is dispensed between a bonding surface of the lens barrel and a fixing ring to bond the bonding surface and the fixing ring. However, since contact surfaces between the lens barrel and the fixing ring are generally smooth surfaces, the fixing ring may be tilted when being assembled with the lens barrel, resulting in varied sizes of gaps between the fixing ring and the lens barrel and inconsistent dissolving states at respective points between the fixing ring and the lens barrel. In such situation, a bonding strength is lower than desired, so the fixing ring may be moved or detached from the lens barrel. An arrangement of lens elements inside the lens barrel may be affected, or even the optical lens may fall apart.

Thus, how to ensure the bonding strength between the lens barrel and the fixing ring is an issue for relevant researchers to work on.

SUMMARY OF THE INVENTION

The invention provides an optical lens having high reliability and durability.

The invention provides an assembling method of an optical lens capable of manufacturing an optical lens having high reliability and durability.

An embodiment of the invention provides an optical lens including a lens barrel, a fixing ring, and at least one lens element. A bonding surface is provided on an inner side of a periphery of an end of the lens barrel, and a plurality of micro-structures are disposed on the bonding surface in a ring-shaped arrangement. The micro-structures protrude from the bonding surface. The fixing ring is disposed inside the bonding surface of the lens barrel. The lens element is disposed inside the lens barrel. The micro-structures on the bonding surface and the fixing ring are dissolved by a solvent, so as to fix the lens element inside the lens barrel.

An embodiment of the invention provides a lens barrel. The lens barrel includes a bonding surface on an inner side of a periphery of an end of the lens barrel. A plurality of micro-structures are disposed on the bonding surface in a ring-shaped arrangement, and the micro-structures protrude from the bonding surface.

An embodiment of the invention provides an assembling method of an optical lens. The method includes providing a lens barrel, wherein a bonding surface is provided on an inner side of a periphery of an end of the lens barrel, a plurality of micro-structures are disposed on the bonding surface in a ring-shaped arrangement, the micro-structures protrude from the bonding surface, and at least one lens element is disposed inside the lens barrel; disposing a fixing ring inside the bonding surface of the lens barrel; and dissolving the micro-structures on the bonding surface and the fixing ring by a solvent, so as to fix the lens element inside the lens barrel.

According to the optical lens, the assembling method of the optical lens, and the lens barrel of the embodiments of the invention, the micro-structures are disposed on the bonding surface of the lens barrel in a ring-shaped arrangement. In addition, the micro-structures on the bonding surface and the fixing ring are dissolved by the solvent, so as to fix the lens element inside the lens barrel. With the capillarity effect when the micro-structures are dissolved, the bonding surface and the fixing ring may be more thoroughly dissolved, so as to facilitate boding between the bonding surface and the fixing ring. In addition, the micro-structures facilitate the bonding strength between the lens barrel and the fixing ring. Therefore, processing in fabrication is simplified, and the production cost is thus reduced. Furthermore, the micro-structures make it easier to keep the gaps at various points between the fixing ring and the lens barrel consistent, and the tilt of the fixing ring is also reduced. Hence, the optical lens, the assembling method of the optical lens, and the lens barrel according to the embodiments of the invention are capable of rendering an optical lens having high reliability and durability.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
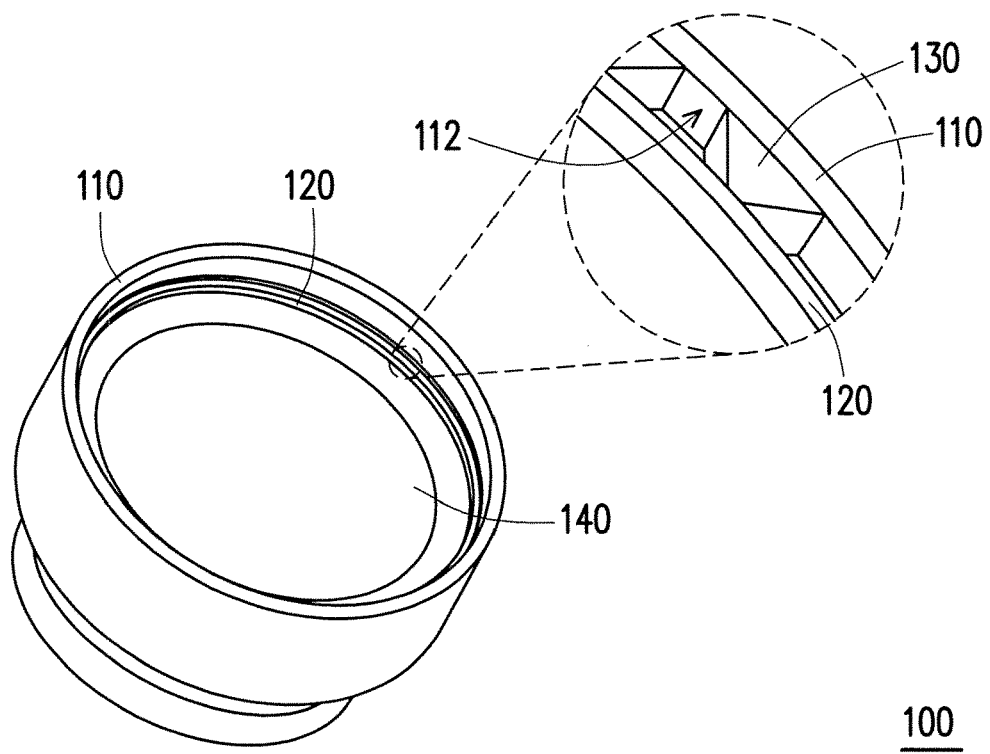
FIG. 1A is a schematic perspective view illustrating an optical lens according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

Figure 1B:
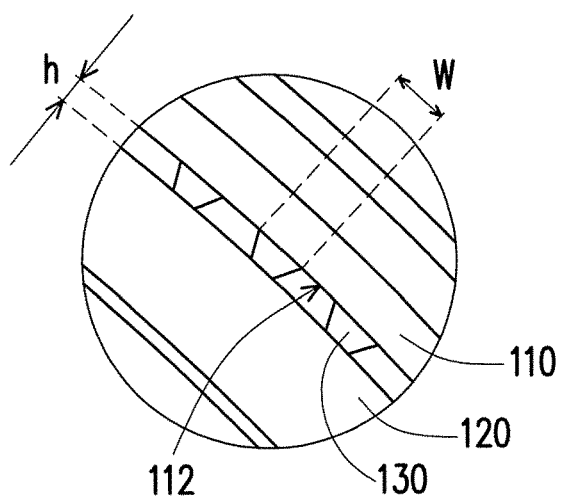
FIG. 1B is a schematic partial cross-sectional view illustrating the optical lens of FIG. 1A.
Figure 2A:
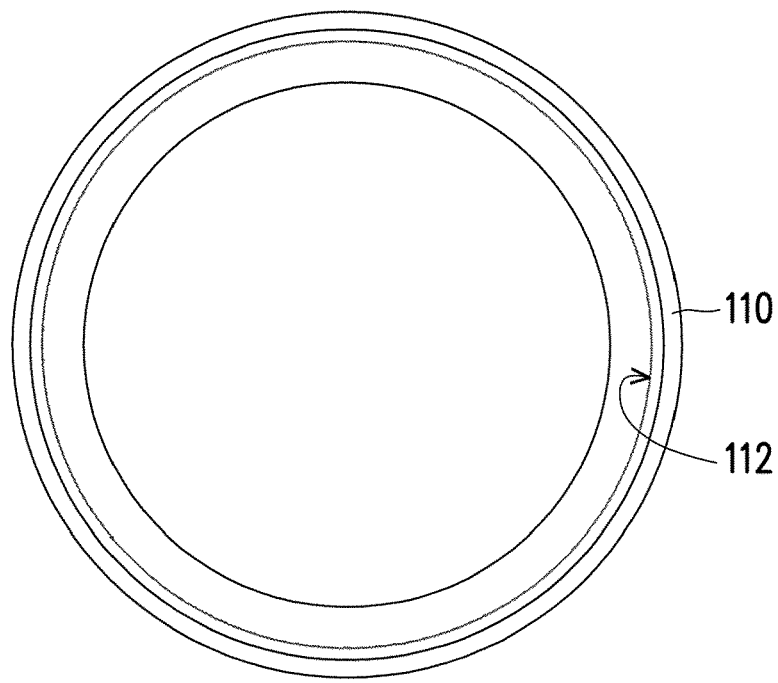
FIG. 2A is a schematic rear view illustrating a lens barrel and a lens element of FIG. 1A.
Figure 2B:
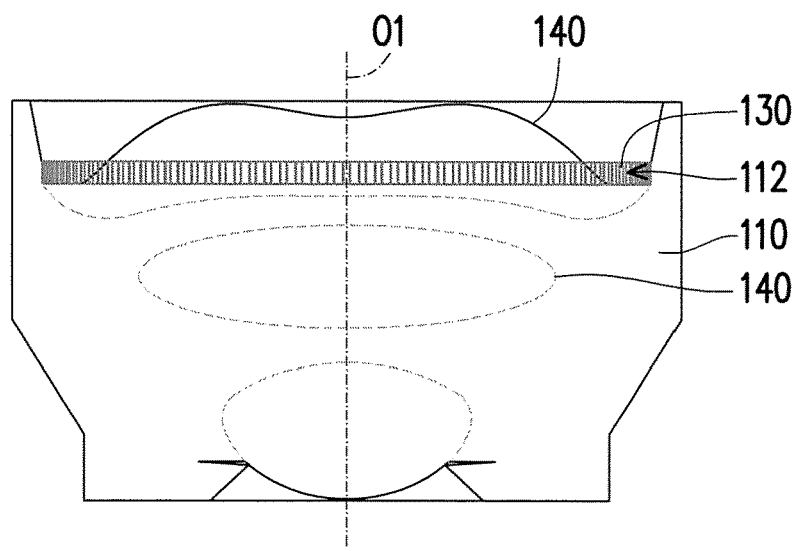
FIG. 2B is a schematic cross-sectional view illustrating the lens barrel and the lens element of FIG. 2A.
Figure 3A:
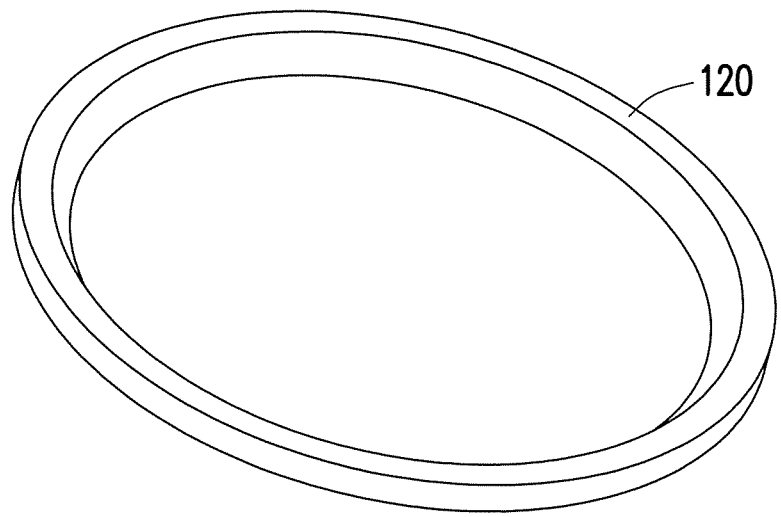
FIG. 3A is a schematic perspective view illustrating a fixing ring of FIG. 1A.
Figure 3B:
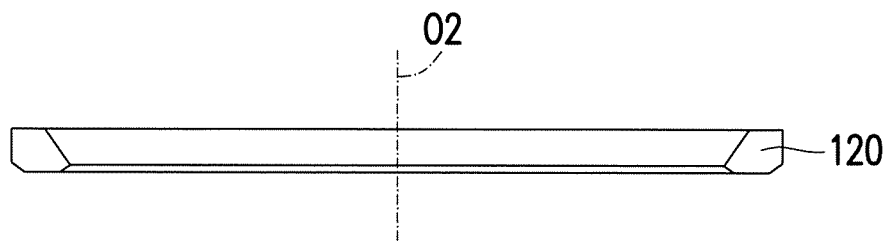
FIG. 3B is a schematic cross-sectional view illustrating a fixing ring of FIG. 1A.
Figure 4:
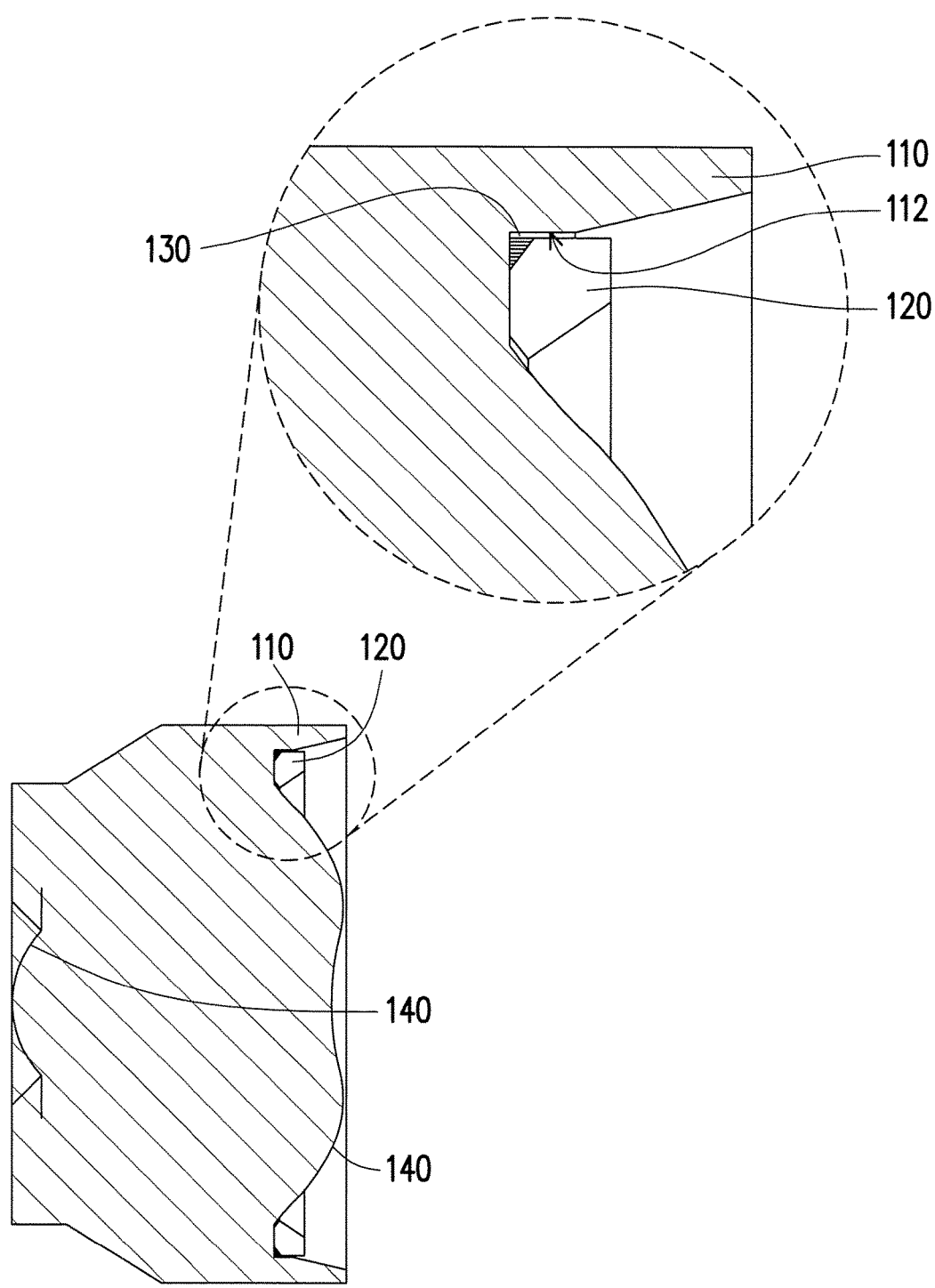
FIG. 4 is a schematic cross-sectional view illustrating the optical lens of FIG. 1A.

FIG. 1A is a schematic perspective view illustrating an optical lens according to an embodiment of the invention, FIG. 1B is a schematic partial cross-sectional view illustrating the optical lens of FIG. 1A, FIG. 2A is a schematic rear view of a lens barrel and a lens element of FIG. 1A, FIG. 2B is a schematic cross-sectional view of the lens barrel and the lens element of FIG. 2A, FIG. 3A is a schematic perspective view illustrating a fixing ring of FIG. 1A, and FIG. 3B is a schematic cross-sectional view illustrating a fixing ring of FIG. 1A. FIG. 4 is a schematic cross-sectional view illustrating the optical lens of FIG. 1A. Referring to FIGS. 1A to 3B, an optical lens 100 of the embodiment includes a lens barrel 110, a fixing ring 120, and at least one lens element 140. In the embodiment, a plurality of the lens elements 140 are described herein as an example. A lens element 140 means a lens, e.g. a convex lens, a concave lens, a spherical lens, an aspheric lens, or a lens having any other shape, and an optical lens 100 means an optical lens assembly having one or more lens elements. A bonding surface 112 is provided on an inner side of a periphery of an end of the lens barrel 110. A plurality of micro-structures 130 are disposed on the bonding surface 112 in a ring-shaped arrangement. In addition, the micro-structures 130 protrude from the bonding surface 112 and are arranged with intervals. For example, the micro-structures 130 surround an optical axis O1 of the lens barrel with intervals. The fixing ring 120 is disposed inside the bonding surface 112 of the lens barrel 110. The lens elements 140 are disposed inside the lens barrel 110.

Figure 5:
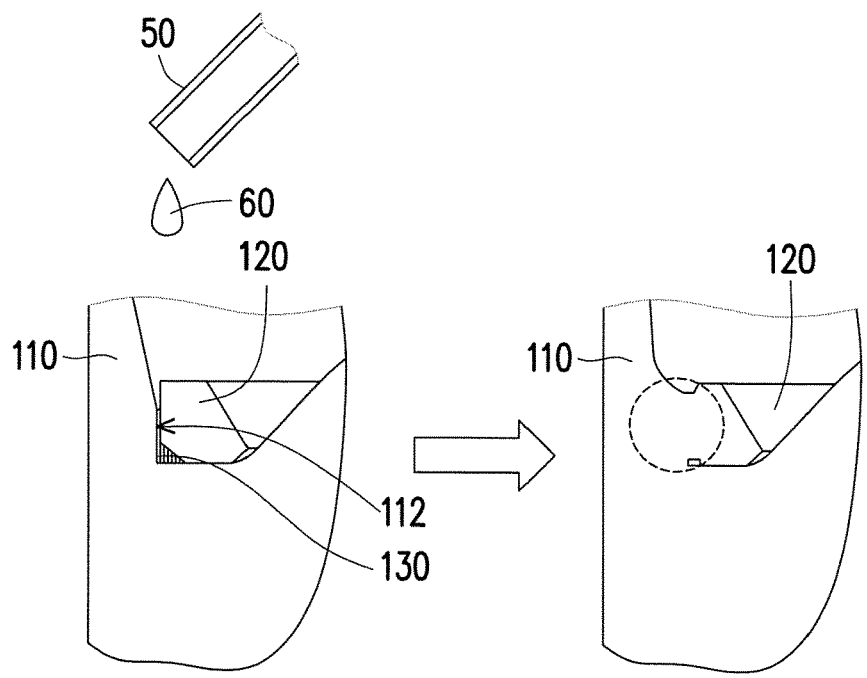
FIG. 5 is a schematic view illustrating that the lens barrel and the fixing ring of FIG. 1A are fixed by a solvent.

FIG. 5 is a schematic view illustrating that the lens barrel and the fixing ring of FIG. 1A are fixed by a solvent. Referring to FIGS. 1A and 5, the micro-structures 130 on the bonding surface 112 and the fixing ring 120 are dissolved by a solvent 60, so as to fix the lens elements 140 inside the lens barrel 110. In the embodiment, a dropper 50 may serve to dispense the solvent 60 into a gap between the fixing ring 120 and the bonding surface 112. Accordingly, the solvent 60 may flow into a space between the fixing ring 120 and the bonding surface 112 and between the fixing ring 120 and the micro-structures 130 due to a capillarity effect. After the solvent is dried, the bonding surface 112, the micro-structures 130, and the fixing ring 120 are fused together, as shown in the right of FIG. 5. The solvent 60 may be any solvent 60 capable of dissolving the lens barrel 110, the micro-structures 130, and the fixing ring 120, and materials of the lens barrel 110, the micro-structures 130, and the fixing ring 120 may include a plastic material, for example. When the fixing ring 120 abuts the lens elements 140 and when the fixing ring 120 is fixed to an end of the lens barrel 110, the lens elements 140 are able to be fixed inside the lens barrel 110 without being detached from the end of the lens barrel 110.

In the embodiment, a cross-section of each of the micro-structures 130 on a plane perpendicular to the optical axis O1 of the lens barrel 110 (as shown in FIG. 1B) is in a trapezoidal shape. A bottom part of the trapezoidal shape is at the side of the bonding surface 112, whereas a top part of the trapezoidal shape is at the side of the fixing ring 120. Moreover, in the embodiment, each of the micro-structures 130 has a width W in a circumferential direction of the lens barrel 110, and the width W is less than 5 micrometers. Furthermore, in the embodiment, each of the micro-structures 130 has a height h in a radial direction perpendicular to the optical axis O1, and the height h is less than 1 micrometer. In an embodiment, a minimum of the width W of the micro-structure 130 may be 0.03 micrometers, whereas a minimum of the height h of the micro-structure 130 may be 0.002 micrometers.

In the optical lens 100 of the embodiment, the micro-structures 130 are disposed on the bonding surface 112 of the lens barrel 110 in a ring-shaped arrangement. Also, the micro-structures 130 on the bonding surface 112 and the fixing ring 120 are dissolved by the solvent 60, so as to fix the lens elements 140 inside the lens barrel 110. With the capillarity effect when the micro-structures 130 are dissolved, the bonding surface 112 and the fixing ring 120 may be more thoroughly dissolved, so as to facilitate bonding between the bonding surface 112 and the fixing ring 120. In addition, the micro-structures 130 facilitate a bonding strength between the lens barrel 110 and the fixing ring 120. Therefore, processing in fabrication is simplified, and a production cost is thus reduced. Moreover, the micro-structures 130 make it easier to keep gaps at various points between the fixing ring 120 and the lens barrel 110 consistent, and a tilt of the fixing ring is also reduced. Therefore, the optical lens according to the embodiment of the invention and an assembling method of the optical lens are capable of rendering an optical lens having high reliability and durability.

Besides, the micro-structure 130 whose cross-section is in a trapezoidal shape also reinforces the capillarity effect when the micro-structure 130 is dissolved, thereby facilitating the bonding strength between the lens barrel 110 and the fixing ring 120.

Figure 6:
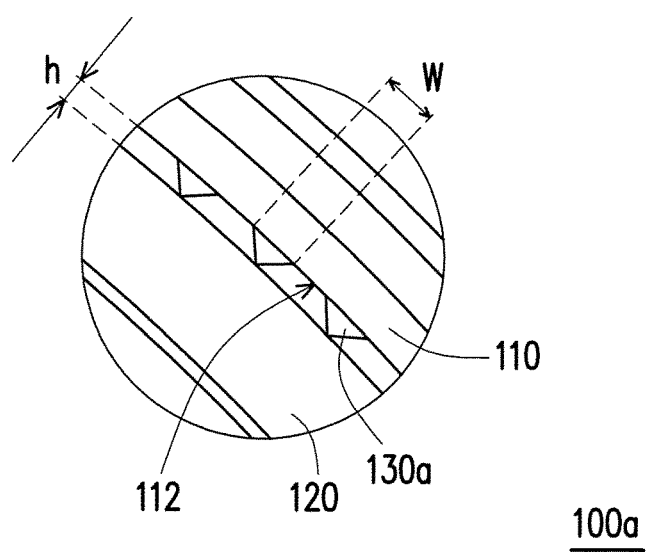
FIG. 6 is a schematic partial cross-sectional view illustrating an optical lens according to another embodiment of the invention.

FIG. 6 is a schematic partial cross-sectional view illustrating an optical lens according to another embodiment of the invention. Referring to FIG. 6, an optical lens 100a of the embodiment is similar to the optical lens 100 of FIGS. 1A and 1B. Main differences between the optical lens 100a and the optical lens 100 will be described in the following. In the optical lens 100a of the embodiment, a cross-section of each micro-structure 130a on a plane perpendicular to the optical axis O1 of the lens barrel 110 is in a triangular shape. A base of the triangular shape is at the side of the bonding surface 112, and a top corner of the triangular shape is at the side of the fixing ring 120. Moreover, in the embodiment, each micro-structure 130a has a width W in the circumferential direction of the lens barrel 110, and the width W is less than 5 micrometers. Furthermore, in the embodiment, each micro-structure 130a has a height h in a radial direction perpendicular to the optical axis O1, and the height h is less than 1 micrometer. In an embodiment, a minimum of the width W of the micro-structure 130a may be 0.03 micrometers, whereas a minimum of the height h of the micro-structure 130a may be 0.002 micrometers. The optical lens 100a of the embodiment is capable of attaining the characteristics and effects of the optical lens 100. Thus, details in this regard will not be repeated in the following. Besides, the micro-structure 130a whose cross-section is in a triangular shape also reinforces the capillarity effect when the micro-structure 130a is dissolved, thereby increasing the bonding strength between the lens barrel 110 and the fixing ring 120.

In an embodiment, an assembling method of an optical lens is provided. The assembling method is suitable for the optical lens 100 or the optical lens 100a. In the following, the assembling method of the optical lens 100 is described as an example. The assembling method of the optical lens 100 includes steps as follows. First of all, referring to FIGS. 2A and 2B, the lens barrel 100 is provided. The bonding surface 112 is provided on the inner side of the periphery of an end of the lens barrel 110. The micro-structures 130 are disposed on the bonding surface 112 in a ring-shaped arrangement and protrude from the bonding surface 112. In addition, at least one lens element 140 is disposed inside the lens barrel 110. In FIG. 2B, a plurality of the lens elements 140 are illustrated as an example. Then, as shown in FIG. 1A, the fixing ring 120 is disposed inside the bonding surface 112 of the lens barrel 110. Subsequently, as shown in FIG. 5, the micro-structures 130 on the bonding surface 112 and the fixing ring 120 are dissolved by the solvent 60, so as to fix the lens elements 140 inside the lens barrel 110. Accordingly, assembling of the optical lens 100 is completed. Details of the steps and effects attained by the assembling method are already described in the previous embodiments. Thus, details in this regard will not be repeated in the following.

In view of the foregoing, according to the optical lens, the assembling method of the optical lens, and the lens barrel of the embodiments of the invention, the micro-structures are disposed on the bonding surface of the lens barrel in a ring-shaped arrangement. In addition, the micro-structures on the bonding surface and the fixing ring are dissolved by the solvent, so as to fix the lens element inside the lens barrel. With the capillarity effect when the micro-structures are dissolved, the bonding surface and the fixing ring may be more thoroughly dissolved, so as to facilitate boding between the bonding surface and the fixing ring. In addition, the micro-structures facilitate the bonding strength between the lens barrel and the fixing ring. Therefore, processing in fabrication is simplified, and the production cost is thus reduced. Furthermore, the micro-structures make it easier to keep the gaps at various points between the fixing ring and the lens barrel consistent, and the tilt of the fixing ring is also reduced. Hence, the optical lens, the assembling method of the optical lens, and the lens barrel according to the embodiments of the invention are capable of rendering an optical lens having high reliability and durability.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An optical lens, comprising:
   a lens barrel, wherein a bonding surface is provided on an inner side of a periphery of an end of the lens barrel, a plurality of micro-structures are disposed on the bonding surface in a ring-shaped arrangement, and the micro-structures protrude from the bonding surface;
   a fixing ring, disposed inside the bonding surface of the lens barrel; and
   at least one lens element, disposed inside the lens barrel, wherein the micro-structures on the bonding surface and the fixing ring are dissolved by a solvent, so as to fix the lens element inside the lens barrel.

2. The optical lens as claimed in claim 1, wherein a cross-section of each of the micro-structures on a plane perpendicular to an optical axis of the lens barrel is in a triangular shape.

3. The optical lens as claimed in claim 2, wherein each of the micro-structures has a width, and the width is less than 5 micrometers.

4. The optical lens as claimed in claim 2, wherein each of the micro-structures has a height, and the height is less than 1 micrometer.

5. The optical lens as claimed in claim 1, wherein a cross-section of each of the micro-structures on a plane perpendicular to an optical axis of the lens barrel is in a trapezoidal shape.

6. The optical lens as claimed in claim 5, wherein each of the micro-structures has a width, and the width is less than 5 micrometers.

7. The optical lens as claimed in claim 5, wherein each of the micro-structures has a height, and the height is less than 1 micrometer.

8. A lens barrel, configured to contain a lens element, comprising a bonding surface on an inner side of a periphery of an end of the lens barrel, wherein a plurality of micro-structures are disposed on the bonding surface in a ring-shaped arrangement, and the micro-structures protrude from the bonding surface, wherein the micro-structures on the bonding surface and a fixing ring are dissolved by a solvent, so as to fix the lens element inside the lens barrel.

9. The lens barrel as claimed in claim 8, wherein a cross-section of each of the micro-structures on a plane perpendicular to an optical axis of the lens barrel is in a triangular shape.

10. The lens barrel as claimed in claim 9, wherein each of the micro-structures has a width, and the width is less than 5 micrometers.

11. The lens barrel as claimed in claim 9, wherein each of the micro-structures has a height, and the height is less than 1 micrometer.

12. The lens barrel as claimed in claim 8, wherein a cross-section of each of the micro-structures on a plane perpendicular to an optical axis of the lens barrel is in a trapezoidal shape.

13. The lens barrel as claimed in claim 12, wherein each of the micro-structures has a width, and the width is less than 5 micrometers.

14. The lens barrel as claimed in claim 12, wherein each of the micro-structures has a height, and the height is less than 1 micrometer.

15. An assembling method of an optical lens, comprising:
   providing a lens barrel, wherein a bonding surface is provided on an inner side of a periphery of an end of the lens barrel, a plurality of micro-structures are disposed on the bonding surface in a ring-shaped arrangement, the micro-structures protrude from the bonding surface, and at least one lens element is disposed inside the lens barrel;
   disposing a fixing ring inside the bonding surface of the lens barrel; and
   dissolving the micro-structures on the bonding surface and the fixing ring by a solvent, so as to fix the lens element inside the lens barrel.

16. The assembling method of the optical lens as claimed in claim 15, wherein a cross-section of each of the micro-structures on a plane perpendicular to an optical axis of the lens barrel is in a triangular shape.

17. The assembling method of the optical lens as claimed in claim 15, wherein a cross-section of each of the micro-structures on a plane perpendicular to an optical axis of the lens barrel is in a trapezoidal shape.

* * * * *